(12) United States Patent
Johansson, Sr.

(10) Patent No.: US 6,830,276 B2
(45) Date of Patent: Dec. 14, 2004

(54) CONSOLE BOX

(75) Inventor: Gunnar Johansson, Sr., Stora Hoga (SE)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 10/605,023

(22) Filed: Sep. 2, 2003

(65) Prior Publication Data

US 2004/0113447 A1 Jun. 17, 2004

(30) Foreign Application Priority Data

Sep. 2, 2002 (EP) .............................................. 02445106

(51) Int. Cl.[7] .............................................. B60R 27/00
(52) U.S. Cl. .................................. 296/24.34; 224/926
(58) Field of Search ................................ 224/926, 483, 224/485, 923; 296/24.34, 37.5, 37.8, 37.12

(56) References Cited

U.S. PATENT DOCUMENTS 6,196,434 B1 * 3/2001 Angran et al. ............... 224/926
6,588,821 B2 * 7/2003 Worrell et al. ............. 296/37.8

FOREIGN PATENT DOCUMENTS

JP 405139199 A 6/1993
JP 405139199 A * 6/1993 ................. 296/37.8

* cited by examiner

*Primary Examiner*—Jason Morrow
(74) *Attorney, Agent, or Firm*—Gigette M. Bejin

(57) ABSTRACT

The invention relates to a console box arrangement for vehicles comprising a housing having a container and a lid, the lid being pivotably arranged about an axis with respect to the container, from a closed position to a fully opened position in which the container and the lid extend in opposite directions along generally the same longitudinal direction, said housing further includes a cupholder which is pivotable about the axis and shaped so as to accommodate and support a drinking glass, cup, bottle, can or similar object. The invention is characterized in that the cupholder includes a first holder component and a second holder component which are pivotable with respect to each other about the axis so that the first holder component can be accommodated in the container and the second holder component can be accommodated in the lid. By means of the invention, an improved console box arrangement is provided, which gives access to a cupholder for the occupants in both the front and rear seats.

6 Claims, 3 Drawing Sheets

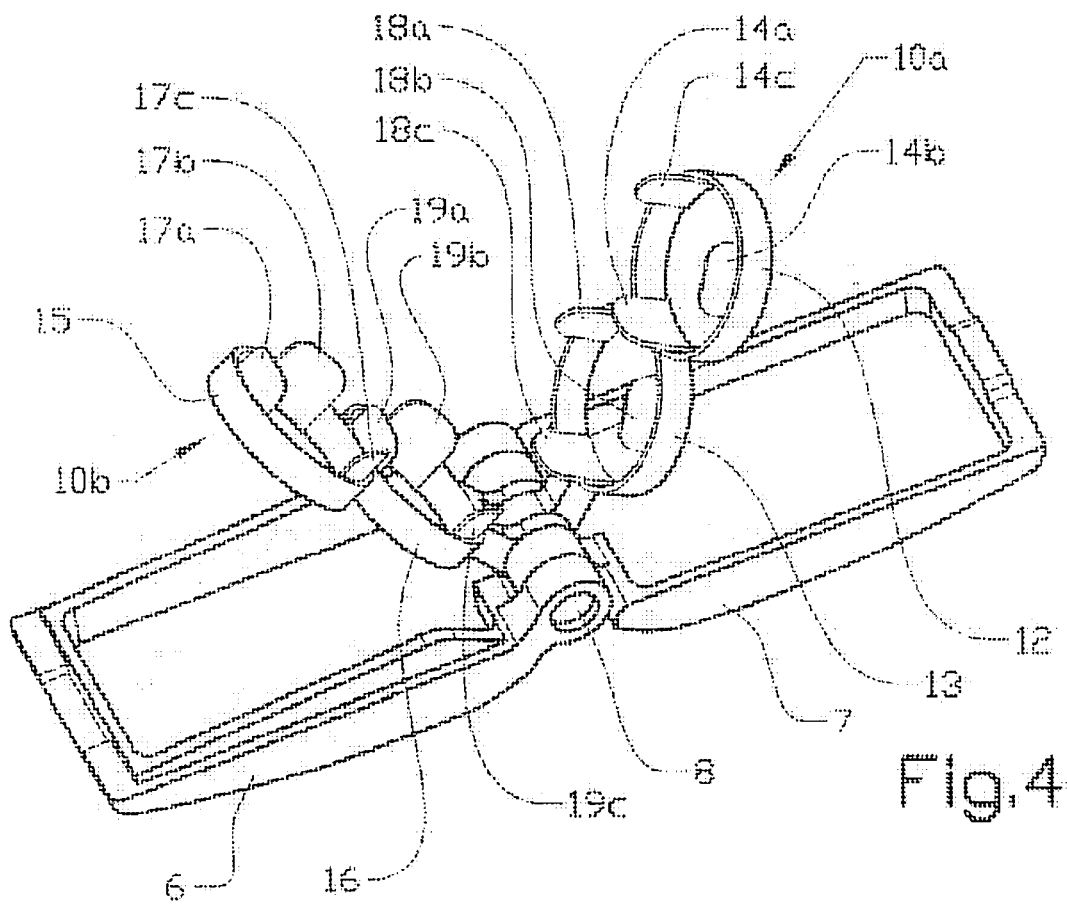
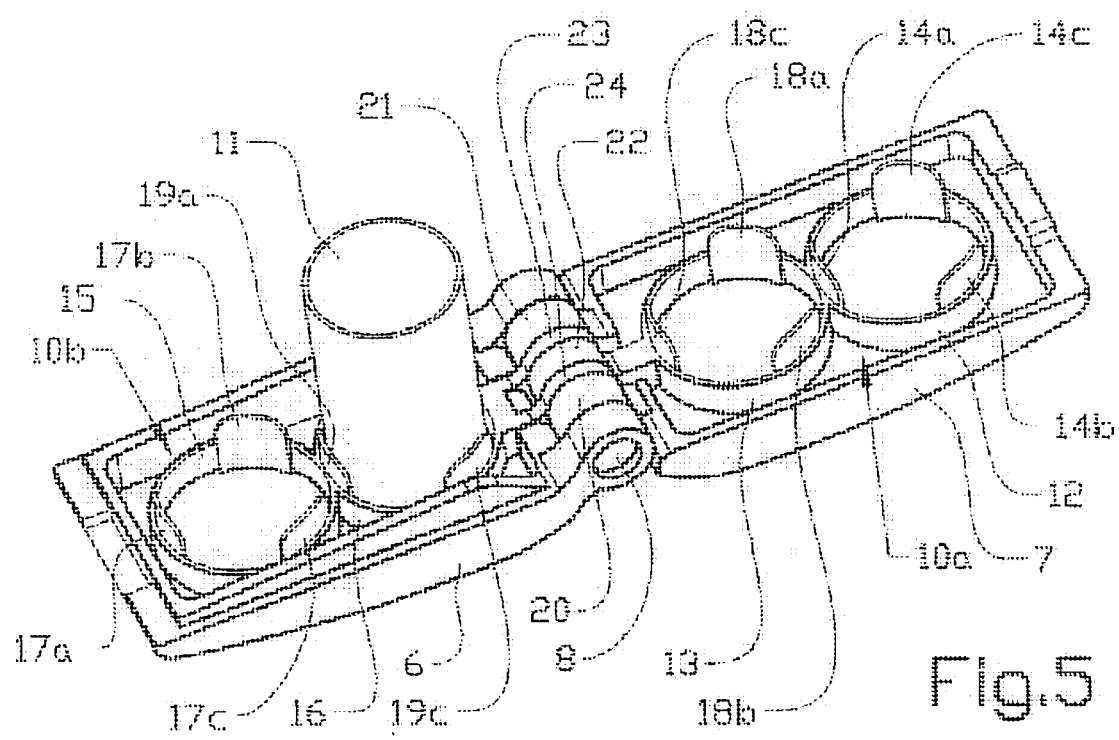

CONSOLE BOX

BACKGROUND OF INVENTION

1. Technical Field

The present invention relates to a console box arrangement for vehicles.

2. Background Art

In the field of motor vehicles, there has been a steady development of various types of interior fittings and equipment for the safety and comfort of the occupants of a vehicle.

For example, many of today's cars are fitted with a console box which is arranged between the two front seats of a car and which is constituted by a container and a lid. The container is easily accessible for the occupants in the front seat of the vehicle and can be used for storing small items such as coins and keys. Also, when the lid is in its closed position, the console box serves as an armrest for the occupants in the front seats.

In some cases, the container is provided with a so-called cupholder, i.e. an arrangement for holding or accommodating a drinking glass, a cup or a can for beverages. The cupholder is arranged inside the container and can be accessed when the lid is opened. An occupant in the vehicle may then place for example a can in the cupholder. This type of equipment is considered as being advantageous as regards the comfort of the occupants.

A previously known console box of the above-mentioned type can be found in the car model Volvo XC70, and comprises a housing with a container and a lid. The lid is pivotable with respect to the container about a pivoting axis. When the lid is closed, the console box can be used as an armrest, and when the lid is fully opened, the lid extend in the opposite direction as compared with the container, i.e. the lid extends towards the occupants in the rear seats of the vehicle. Furthermore, the housing comprises a cupholder element which is pivotable about the same axis as the lid and which is shaped so as to accommodate and support a drinking glass, a cup, a can or a similar object. The cupholder element can be pivoted from a first position in which it is accommodated in the container (and is easily accessible for the occupants in the front seats) to a second position in which it is accommodated in the lid (and is easily accessible for the occupants in the rear seats). This type of cupholder is obviously advantageous for the comfort of both the rear seat occupants and the front seat occupants.

A further console box provided with a cupholder is known from the patent document DE 4415732. This console box is arranged so that its lid is provided with a cupholder component. When the lid has been pivoted to a fully opened position in which the lid extends rearwards in the vehicle, the lid and the cupholder component will be easily accessible for the occupants in the rear seats.

Although these two previously known arrangements function in a satisfactory manner, there is still a demand for further improvements in the field of console box arrangements having cupholders.

SUMMARY OF INVENTION

An object of the present invention is to provide an improved, multifunctional cupholder for a vehicle, in particular having a cupholder which can be used for both the front seat occupants and the rear seat occupants of the vehicle.

In accordance with the invention, this object is accomplished by means of an arrangement as mentioned initially, which arrangement is characterized in that the cupholder comprises a first holder component and a second holder component which are pivotable with respect to each other about said axis so that the first holder component can be accommodated in the container and the second holder component can be accommodated in the lid.

By means of the invention, certain advantages are provided. For example, the cupholder can be separated into its two holder components, i.e. the first holder component and the second holder component. If the first holder component is positioned in the container and the second holder component is positioned in the lid, all occupants in a vehicle (i.e. in both the front and rear seats) may have simultaneous access to a cupholder.

According to a preferred embodiment, each one of said holder components comprises at least one ring-shaped element. The diameter of said ring-shaped element generally corresponding to that of a normal drinking glass, cup, can etc.

BRIEF DESCRIPTION OF DRAWINGS

In the following text, the invention will be described in detail with reference to the attached drawings. These drawings are used for illustration only and do not in any way limit the scope of the invention. In the drawings:

FIG. 4 shows the console box arrangement of FIG. 1 in a third position, with an open lid; and FIG. 5 shows the console box arrangement of FIG. 1 in a fourth position, with an open lid.

DETAILED DESCRIPTION

Figure 1:
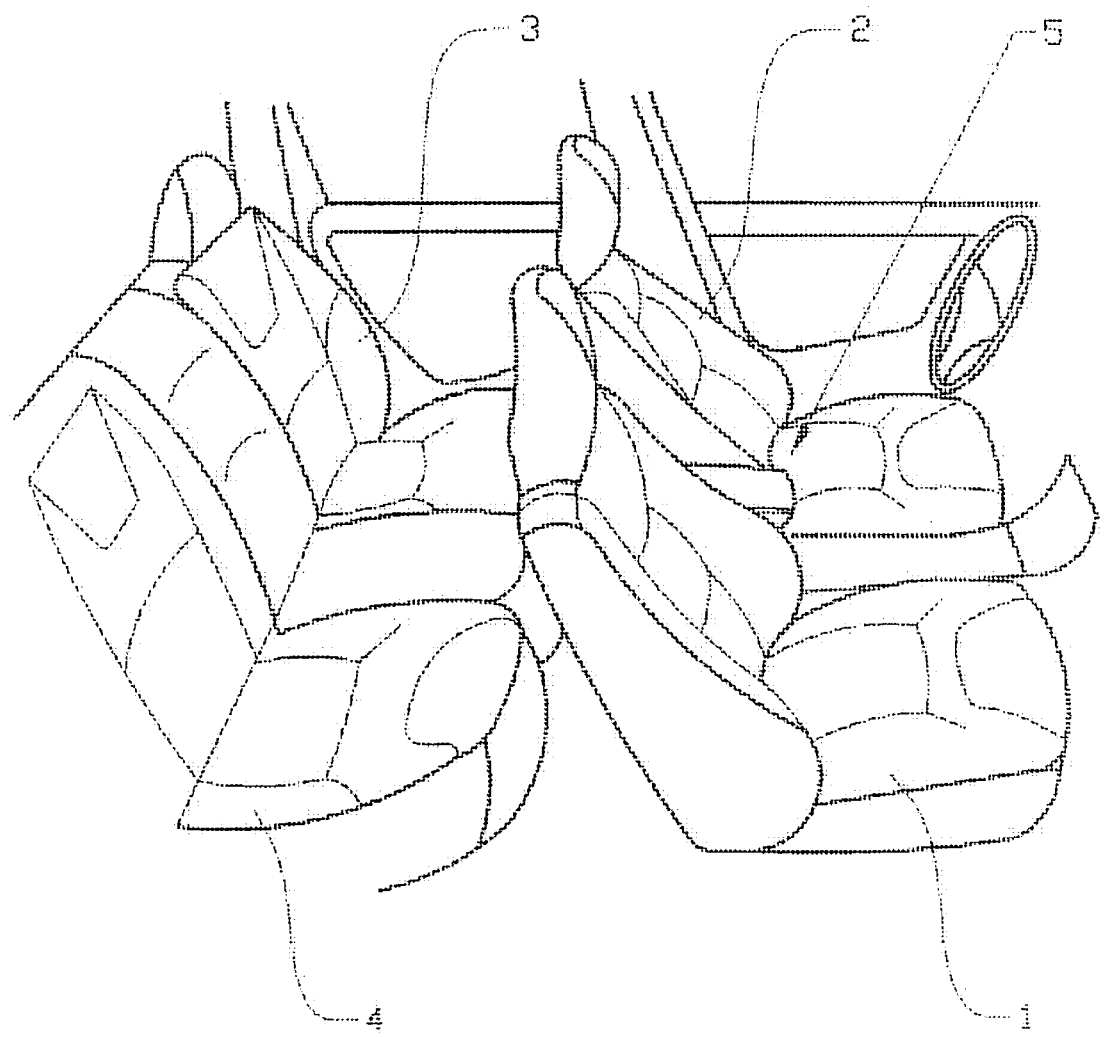
FIG. 1 shows the interior of a car which is fitted with the console box arrangement according to the present invention.
Figure 2:
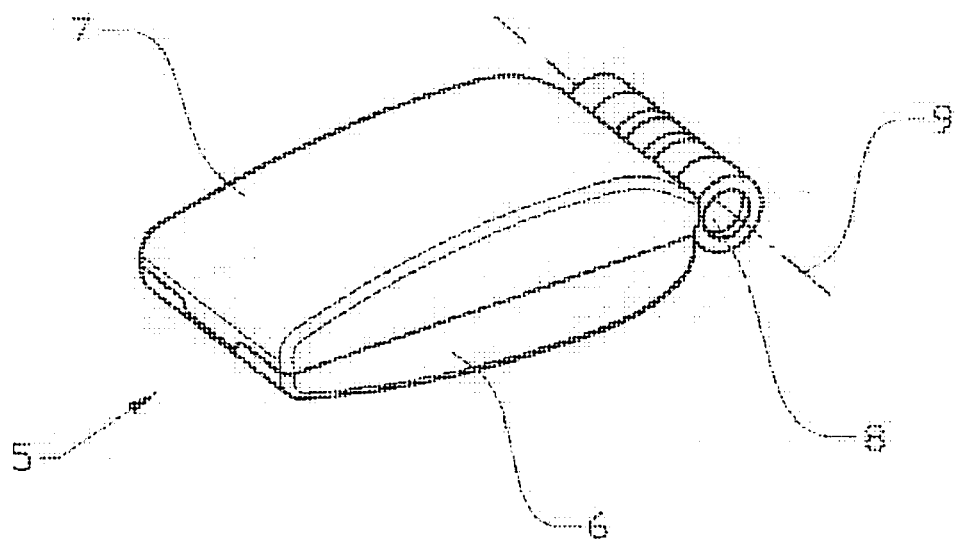
FIG. 2 shows the console box arrangement of FIG. 1 in a first position with its lid being closed.

In the following text an embodiment of the present invention will be described in detail. With reference to FIG. 1, there is shown the interior of a car. In a manner which is known per se, the car is provided with two front seats 1, 2 and two rear seats 3, 4. Between the two front seats 1, 2, a console box arrangement is arranged. In accordance with the invention and as shown in FIGS. 1 and 2, the console box is constituted by a housing 5 which in turn comprises a container 6 and a lid 7. The lid 7 can be pivoted about a pivoting axis 8 which extends in a direction generally as indicated by means of reference numeral 9 in FIG. 2.

When the lid 7 is closed, the interior of the container 6 cannot be accessed and the top side of the lid 7 can suitably be used as an armrest by the driver of the vehicle or by an occupant in the front passenger seat. The pivoting axis 8 is positioned at the rear side of the console box arrangement, i.e. the side of the housing 5 which is closest to the back seats 3, 4.

Figure 3:
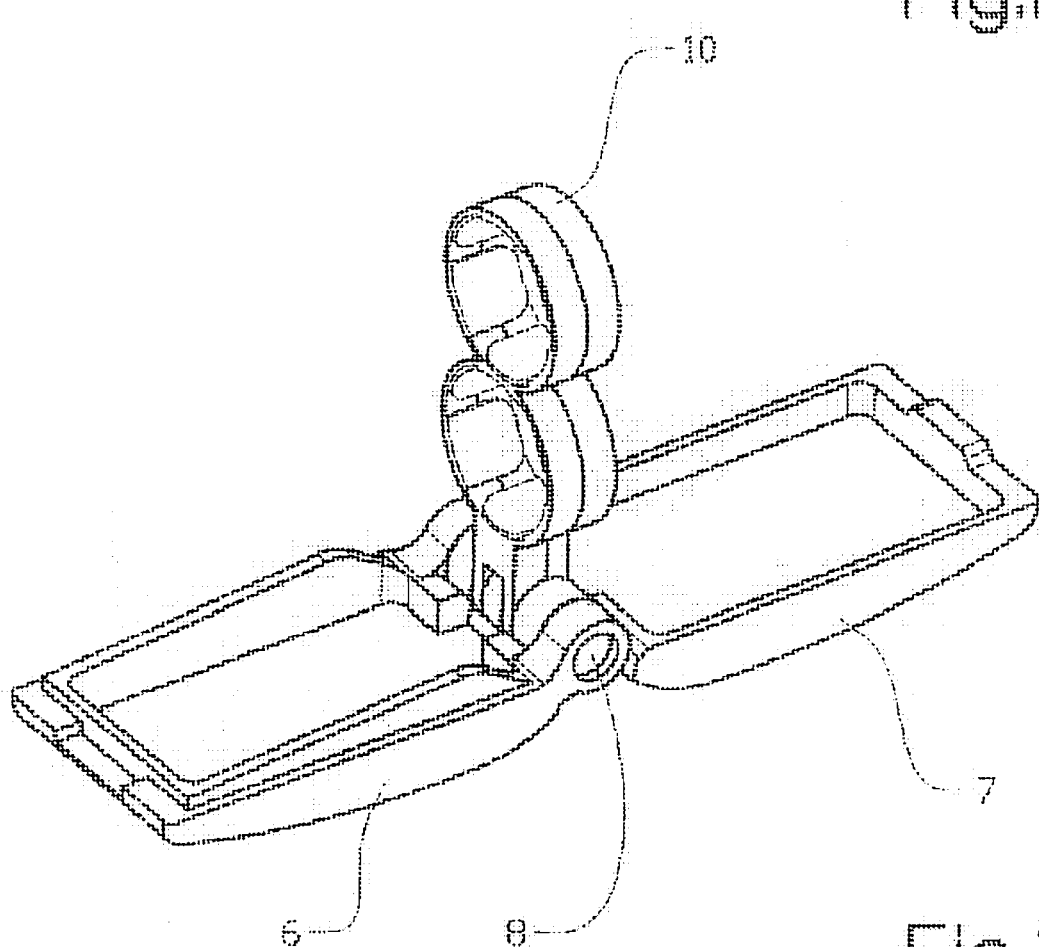
FIG. 3 shows the console box arrangement of FIG. 1 in a second position with its lid being fully openend.

In FIG. 3, the console box arrangement according to the invention is shown in a position in which the lid 7 has been opened fully, i.e. the lid 7 has been pivoted about its pivoting axis 8 from its closed position to its fully opened position. In this position, the lid 7 extends along a generally horizontal plan. Also, in this position, the container 6 and the lid 7 extend in opposite directions along generally the same longidutinal direction. As indicated in FIG. 3, the container 6 is now accessible for the occupants of the front seats, whereas the lid 7 extends towards the rear of the vehicle compartment and consequently is located closest to the occupants located in the rear seats.

In FIG. 3, a cupholder 10 according to the invention is shown. As will be described in detail below, this cupholder 10 is generally formed as at least two circular sections which are positioned next to each other and which are dimensioned so as to fit inside the container 6 and the lid 7. Also, the cupholder 10 is provided with means so as to allow pivoting about the same axis 8 as the lid 7. As a result, the cupholder 10 can be pivoted from a first position in which it is accommodated in the container 6 and to a second position in which it is accommodated in the lid 7. FIG. 3 shows the cupholder 10 in a mid-position roughly halfway been said first and second positions.

As shown in FIG. 4, an important feature of the present invention is that the cupholder 10 is formed by two independent holder components, i.e. a first holder component 10a and a second holder component 10b. The holder components 10a, 10b can be separated and pivoted in relation to each other, about the above-mentioned pivoting axis 8. More precisely, the first holder component 10a is arranged to be pivoted so as to assume a working position in which it is accommodated at least partly inside the container 6 while the second holder component 10b can be pivoted so as to assume a working position in which it is accommodated at least partly inside the lid 7. FIG. 4 shows the holder components 10a, 10b in a position in which they are separated but have not been pivoted to their working positions.

In FIG. 5, the holder components 10a, 10b are shown in their normal working positions in the container 6 and the lid 7, respectively. As is apparent from FIG. 5 (see also FIG. 1), the container 6 and the first holder component 10a are arranged to be located close to the occupants of the front seats of the vehicle in question, whereas the lid 7 and the second holder component 10b are arranged to be located close to the occupants of the rear seats of the vehicle. This means that when the lid 7 is in its fully opened condition, in which the container 6 and the lid 7 extend in opposite directions along generally the same longidutinal direction, the first holder component 10a is easily accessible to the passengers in the front seats and the second holder component 10b is easily accessible to the passengers in the rear seats. This means that for example a passenger in the front seat may use the first holder component 10a for holding a glass 11, as shown in FIG. 5.

The holder components 10a, 10b can also be brought together and pivoted as a single unit, so that the entire cupholder component 10 is positioned in either the container 6 or the lid 7. However, in those cases where there are occupants in both the front and rear seats, the two holder components 10a, 10b are suitably separated so as to give all occupants access to a cupholder.

As best seen in FIGS. 4 and 5, the first holder component 10a comprises two generally circular and ring-shaped components 12, 13 which are attached to each other side by side. The first circular component 12 is provided with three projections or tabs 14a, 14b, 14c, each of which extends along a small segment of the circumference of the circular component 12. In this manner, the projections 14a, 14b, 14c define three spaces or recesses (i.e. between the projections). In a similar manner, the second holder component 10b comprises two circular components 15, 16. The first circular component 15 is provided with three further projections 17a, 17b, 17c which define three spaces along the circumference of said circular component 15. The projections 14a, 14b, 14c of the first circular component 12 of the first holder component 10a are arranged to cooperate with the spaces of the corresponding circular component 15 of the second holder component 10b, and vice versa, i.e. suitably so that the projections 14a, 14b, 14c of the first circular component 12 can be pressed so as to fit between the spaces of the corresponding circular component 15.

Also, the remaining circular components 13, 16 of the first and second holder components 10a, 10b, respectively, are arranged in a similar manner. This means that the second circular component 13 of the first holder component 10a is provided with three projections 18a, 18b, 18c which cooperate with spaces provided on the corresponding circular component 16 of the second holder component 10b, and that the second circular component 15 of the second holder component 10b is provided with three further projections 19a, 19b, 19c which cooperate with spaces provided on the corresponding circular component 13 of the first holder component 10a. This also means that the projections 14a, 14b, 14c, 17a, 17b, 17c, 18a, 18b, 18c, 19a, 19b, 19c and the spaces of the holder components 10a, 10b match and fit together when the entire cupholder 10 is folded together so as to assume the position as shown in FIG. 3.

In order to provide the pivoting movement of the lid 7, it is provided with two generally ring-shaped elements, as indicated with reference numerals 20 and 21 in FIG. 5. These ring-shaped elements 20, 21 are arranged so that they enclose a shaft (not shown) which in turn defines the pivoting axis 8 for the lid 7. The holder components 10a, 10b are arranged in a similar manner, i.e. the first holder component 10a is provided with a further ring-shaped element 22 and the second holder component 10b is provided with two ring-shaped elements 23, 24, said ring-shaped elements 22, 23, 24 being positioned around the same shaft as the above-mentioned ring-shaped elements 20, 21 of the lid 7. In this manner, the pivoting movement of the first holder component 10a with respect to the second holder component 10b is provided by means of a compact hinge mechanism.

Although not shown in the drawings, it can be noted that the container 6 is preferably also used as a cover for a further receptacle (not shown), i.e. a receptacle located under the container 6 shown in the drawings. To this end, the container 6 is preferably arranged so as to be pivoted about the axis 8, for accessing said receptacle.

It should be noted that the present invention presents an advantage in that it allows the two holder components 10a, 10b to assume their separate positions in the container 6 and the lid 7, respectively, as shown in FIG. 5. This means that both the occupants in the front and rear seats of a vehicle may have access to a cupholder simultaneously. This is of course an advantage as regards the comfort for the occupants in the vehicle. Furthermore, in the folded-together condition shown in FIG. 3, the cupholder 10 requires very little space, which is a further advantage with the present invention.

If, for instance, there are no occupants in the rear seats, the cupholder 10 can be folded together and is then suitably positioned in the container 6, so as to be used by the front seat occupants only. In this case, it can be noted that the height of the projections 14a, 14b, 14c, 17a, 17b, 17c, 18a, 18b, 18c, 19a, 19b, 19c define the total height of the combined holder component 10 when folded together.

The cupholder 10 is preferably manufactured from a suitable plastic material. Furthermore, the diameter of the circular components 12, 13, 15, 16 is generally chosen so that standard-type of cans for soft drinks, glasses, paper and plastic cups etc. will fit inside the respective circular component. Furthermore, the inside of the circumference of the ring-shaped elements 12, 13, 15, 16 which together form the first and second holder components 10a, 10b may be coated with a material which presents a relatively high frictional force. This means that cups, glasses and similar objects which are positioned in the holder components 10a, 10b can be held steadily.

The invention is not limited to the embodiment described, but can be modified within the scope of the appended claims. For example, the dimensions of the console box may vary. The width of the container and the lid is limited by the available distance between the two front seats (see FIG. 1), whereas the length of the cupholder 10 is less than the length of the container and the lid.

Furthermore, as shown in the drawings, each holder component 10a, 10b may be formed so as to accommodate two cups or glasses. Alternatively, each holder component 10a, 10b may be formed so as to accommodate one, three or more cups or glasses.

Finally, the present invention is not limited to use in cars but is also suitable for other types of vehicles, such as trucks and buses, and also airplanes.

What is claimed is:

1. A console box arrangement for vehicles comprising:
   a housing having a container and a lid, the lid being pivotably arranged about an axis with respect to the container, from a closed position to a fully opened position in which the container and the lid extend in opposite directions along generally the same longitudinal direction; and
   a cupholder which is pivotable about the axis, the cupholder having a first holder component and a second holder component wherein each is pivotable with respect to the other about the axis so that the first holder component and the second holder component can together be accommodated in one of the container or the lid, the first cupholder is further adapted to be separately accommodated in the container while the second cupholder is adapted to be separately accommodated in the lid.

2. The arrangement according to claim 1, wherein each holder component comprises at least one ring-shaped element for holding a drinking glass.

3. The arrangement according to claim 2, wherein at least one ring-shaped element comprises a plurality of projections defining spaces along the circumference of the at least one ring-shaped element, so that said first holder component and said second holder component can be folded together by fitting projections on said first holder component.

4. The arrangement according to claim 1, wherein the lid extends along a generally horizontal plane when fully opened.

5. A vehicle having a console box arrangement according to claim 1.

6. A console box arrangement for vehicles comprising:
   a housing having a container and a lid, the lid being pivotably arranged about an axis with respect to the container, from a closed position to a fully opened position in which the container and the lid extend in opposite directions along generally the same longitudinal direction; and
   a cupholder which is pivotable about the axis, the cupholder having a first holder component and a second holder component wherein each is pivotable with respect to the other about the axis so that the first holder component can be accommodated in the container, wherein each holder component comprises at least one ring-shaped element for holding a drinking glass, the at least one ring-shaped element includes a plurality of projections defining spaces along the circumference of the at least one ring-shaped element, so that said first holder component and said second holder component can be folded together by fitting projections on said first holder component.

* * * * *